No. 732,824. PATENTED JULY 7, 1903.
J. BRIZARD.
FAUCET.
APPLICATION FILED FEB. 16, 1903.
NO MODEL.

Witnesses
Jean Germain
Guillaume Pioche

Inventor
Jules Brizard
by R H Adda
Attorney

No. 732,824.

Patented July 7, 1903.

UNITED STATES PATENT OFFICE.

JULES BRIZARD, OF DOMÈNE, FRANCE.

FAUCET.

SPECIFICATION forming part of Letters Patent No. 732,824, dated July 7, 1903.

Application filed February 16, 1903. Serial No. 143,586. (No model.)

*To all whom it may concern:*

Be it known that I, JULES BRIZARD, a citizen of the French Republic, residing at Domène, department of Isère, France, have invented certain new and useful Improvements in Faucets, of which the following is a specification.

This invention relates to a faucet adapted to prevent waste of liquid or fluid should it be left open for too long a period. This is accomplished by compelling the person drawing the liquid or fluid to operate the faucet at certain short intervals to insure continuous delivery, the faucet itself stopping the flow of liquid when a certain previously-determined quantity has been discharged. The delivery can also be stopped at any moment by placing the plug or spigot of the faucet in an intermediate position, as hereinafter described.

The improved faucet is represented in the annexed drawings.

Figure 1:
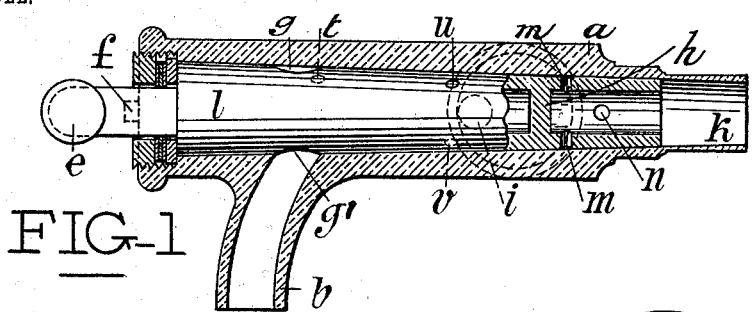
Figure 2:
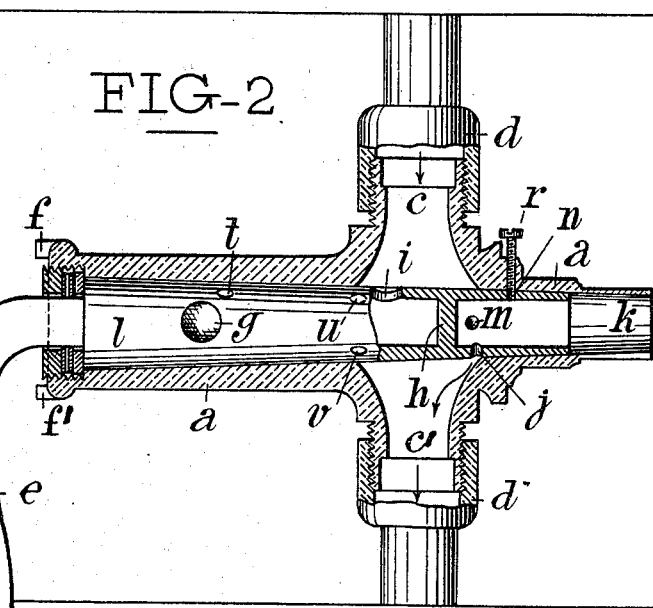

Figure 1 is a vertical section; Fig. 2, a horizontal section; and Fig. 3, a diagram showing different positions of the spigot.

The faucet proper comprises, essentially, a tubular seat $a$, carrying at a certain point a neck $b$ for the discharge of the liquid, and at a short distance beyond two horizontal unions $c$ $c'$, from each of which a pipe $d$ $d'$ branches, communicating, respectively, with a reservoir $d^2$ $d^3$ of the required capacity. If two reservoirs are used, their capacity is so regulated that while one is being filled the other is emptied, and vice versa.

The spigot $l$ of the faucet is of the usual truncated conical shape and is operated by a handle $e$, which can describe half a revolution, the movement being limited by two stops $f$ $f'$. This spigot has two discharge-openings $g$ $g'$, each adapted to communicate with the neck $b$. Adjacent the unions $c$ $c'$ the spigot is closed by a partition $h$, and at each side of this partition openings $i$ $j$, respectively, are made. The spigot also has two openings $m$ $m$ for the purpose, even when the tap is closed, of allowing the inlet of liquid into the two reservoirs, with the result that said reservoirs are always under a constant pressure, being in direct communication with the source of supply. When the faucet is opened, said openings $m$ are closed by the seat and their action ceases. Finally, the spigot has an orifice $n$ for the purpose of allowing a continuous running stream of water during frost to prevent freezing. This latter opening can be placed in communication at will with a channel in the seat and be closed when desired by a screw $r$ or a stopper or small plug, by which it can be opened or closed, according to requirements.

The faucet is fitted with its end $k$ into the main pipe or conduit or other source of supply, and on giving the spigot the position shown in Fig. 1 the faucet is opened and liquid can flow, as indicated by the arrows, passing through the opening $j$, entering the union $c'$, and thence by conduit $d'$ fills the corresponding reservoir $d^3$. The other reservoir $d^2$ is emptied at the same time, and the liquid passing through the conduit $d$ and union $c$ enters the spigot through the opening $i$ and is finally discharged through the neck $b$. It is obvious that when one reservoir is empty the flow of liquid ceases. If a further supply is required, the spigot must be given a half-revolution. The opening $j$ will then communicate with the union $c$ and the reservoir $d^2$ can be filled, the contents of the reservoir $d^3$ at the same time passing into the faucet through the union $c'$ and the opening $i$. The capacity of the reservoirs being calculated so that one is emptied while the other is being filled, continuous delivery is assured on condition that the spigot is operated at short intervals, waste of liquid being thus prevented in an efficient manner.

Should it be required to completely empty both reservoirs, leaving the liquid shut off from the supply, three additional orifices $t$ $u$ $v$ are made in the spigot. The orifices $u$ and $v$ are arranged diametrically opposite each other, orifice $u$ being at an angle of forty-five degrees to the left of opening $i$, and the orifice $t$ is situated on a median generator of the holes $u$ and $v$—that is to say, forty-five degrees to the right of the handle $e$. Assuming the handle to be in a vertical position, by giving the spigot one-eighth of a revolution to the left the complete emptying of the reservoirs takes place, and on making the same movement to the right the faucet is completely cut off from the water in the reservoirs and the discharge stopped.

A quarter-revolution of the spigot to the left or right will effect the emptying of one of the reservoirs and the filling of the other and on the handle of the spigot being set vertically will shut off the flow and place the two reservoirs in direct communication with the source of supply.

Figure 3:
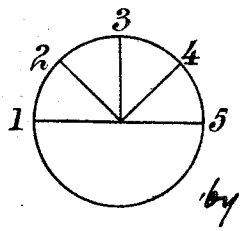

The diagram Fig. 3 shows the different positions which can be given to the spigot. When it is at 1 and 5, the emptying of one reservoir and the filling of the other simultaneously takes place, at 2 the emptying of the two reservoirs and the filling stopped, at 3 the filling of both reservoirs, and at 4 the complete stoppage of supply and discharge.

The improved faucet can be applied to any existing water systems and is adapted for use with any liquids or fluids, and may be modified according to its purpose without departing from the spirit of my invention.

What I claim is—

1. In a faucet, the combination with a source of supply of fluid, of a tubular seat, having two unions opposite one another, a reservoir in communication with each of said unions, a hollow spigot adapted to be rotated in said seat, provided with a partition and having two oppositely-disposed openings for the discharge of fluid, means of communication between one of the reservoirs and the interior of the spigot at rear of said partition, and means of communication between the other reservoir and the interior of said spigot in front of the partition substantially as described for the purpose set forth.

2. In a faucet, the combination with a source of supply of fluid, of a tubular seat having two unions opposite one another, a reservoir in communication with each of said unions, a hollow spigot adapted to be rotated in said seat, provided with a partition and having two oppositely-disposed openings for the discharge of fluid, means of communication between one of the reservoirs and the interior of the spigot at rear of said partition, means of communication between the other reservoir and the interior of said spigot in front of the partition, and means for placing the aforesaid reservoirs in direct communication with the supply substantially as described for the purpose set forth.

3. In a faucet, the combination with a source of supply of fluid, of a tubular seat having two unions opposite one another, a reservoir in communication with each of said unions, a hollow spigot adapted to be rotated in said seat, provided with a partition, and having two oppositely-disposed openings for the discharge of fluid, means of communication between one of the reservoirs and the interior of the spigot at rear of said partition, means of communication between the other reservoir and the interior of said spigot in front of the partition, means for placing the aforesaid reservoirs in direct communication with the supply and means for permitting the complete emptying of the reservoirs by completely shutting off the faucet from the source of supply, substantially as described for the purpose set forth.

4. In a faucet, the combination with a source of supply of fluid, of a tubular seat having two unions opposite one another, a reservoir in communication with each of said unions, a hollow spigot adapted to be rotated in said seat, provided with a partition and having two oppositely-disposed openings for the discharge of fluid, means of communication between one of the reservoirs and the interior of the spigot at rear of said partition, means of communication between the other reservoir and the interior of said spigot, in front of the partition, means for placing the aforesaid reservoirs in direct communication with the supply, means for permitting the complete emptying of the reservoirs by completely shutting off the faucet from the source of supply, and closable means for permitting the flow of a small stream of fluid to prevent freezing substantially as described.

In witness whereof I have signed this specification in the presence of two witnesses.

JULES BRIZARD.

Witnesses:
MARCEL JACQUENNET,
LOUIS FRANÇOIS BLANCHARD.